US008974000B2

(12) United States Patent
Navatte et al.

(10) Patent No.: US 8,974,000 B2
(45) Date of Patent: Mar. 10, 2015

(54) MOTORIZED ARTICULATION FOR VEHICLE SEAT

(75) Inventors: Nicolas Navatte, Condé-sur-Noireau (FR); Thierry Pera, Belfort (FR); Ignacio Alvarez, Massy (FR); Jean-Marc Judic, Saint Remy les Chevreuse (FR)

(73) Assignee: Faurecia Sieges d'Automobile, Nanterre (FR)

(*) Notice: Subject to any disclaimer, the term of this patent is extended or adjusted under 35 U.S.C. 154(b) by 0 days.

(21) Appl. No.: 14/115,522

(22) PCT Filed: Apr. 27, 2012

(86) PCT No.: PCT/FR2012/050954
§ 371 (c)(1),
(2), (4) Date: Dec. 3, 2013

(87) PCT Pub. No.: WO2012/156611
PCT Pub. Date: Nov. 22, 2012

(65) Prior Publication Data
US 2014/0075719 A1 Mar. 20, 2014

(30) Foreign Application Priority Data
May 13, 2011 (FR) ...................................... 11 54146

(51) Int. Cl.
*B60N 2/20* (2006.01)
*B60N 2/225* (2006.01)
*B60N 2/02* (2006.01)

(52) U.S. Cl.
CPC .............. *B60N 2/225* (2013.01); *B60N 2/0232* (2013.01); *B60N 2/2251* (2013.01); *B60N 2/2252* (2013.01); *B60N 2/02* (2013.01); *B60N 2002/0236* (2013.01)
USPC .................................................... 297/362.11

(58) Field of Classification Search
USPC ................................. 297/362.11, 362; 16/239
See application file for complete search history.

(56) References Cited

U.S. PATENT DOCUMENTS

| | | | |
|---|---|---|---|
| 4,930,841 A * | 6/1990 | Wittig ....................... | 297/378.12 |
| 7,293,829 B2 * | 11/2007 | Thiel et al. ............... | 297/216.12 |
| 2008/0150312 A1 | 6/2008 | Lehr et al. | |
| 2010/0026142 A1 | 2/2010 | Jones et al. | |

FOREIGN PATENT DOCUMENTS

| | | |
|---|---|---|
| DE | 102006019871 A1 * | 10/2007 |
| DE | 102008032162 B2 | 12/2009 |
| EP | 1574749 A1 | 9/2005 |
| FR | 2880308 | 1/2006 |
| GB | 2469280 A | 10/2010 |

OTHER PUBLICATIONS

International Search Report and Written Opinion for related International Application No. PCT/FR2012/050954; report dated Jul. 16, 2012.

* cited by examiner

*Primary Examiner* — Milton Nelson, Jr.
(74) *Attorney, Agent, or Firm* — Miller, Matthias & Hull LLP

(57) ABSTRACT

A vehicle seat articulation mechanism comprising a first member intended to be connected to the seat part, a second member intended to be connected to the backrest, about an axis of articulation, reduction gearing arranged between an input member and the second member, a piezoelectric motor having a rotor connected to the reduction gearing to drive the rotation of the second member with respect to the first member through the reduction gearing, in which the reduction ratio of the reduction gearing is greater than or equal to 150, and in which the nominal rotational speed of the piezoelectric motor is less than 500 revolutions/min. Seat comprising such a mechanism.

13 Claims, 11 Drawing Sheets

MOTORIZED ARTICULATION FOR VEHICLE SEAT

CROSS-REFERENCE TO RELATED APPLICATIONS

This application is a 35 USC §371 U.S. national stage filing of International Patent Application No. PCT/FR2012/050954 filed on Apr. 27, 2012, and claims priority under the Paris Convention to French Patent Application No. FR 11 54146 filed on May 13, 2011.

FIELD OF THE DISCLOSURE

The present invention relates to motorized articulations (also referred to herein as "hinges") for a vehicle seat.

BACKGROUND OF THE DISCLOSURE

It relates more particularly to a motorized hinge mechanism connecting one part of the seat to another part of the seat, for example a backrest to a seat part.

In the known prior art, such motorized hinges comprise a DC motor, reduction gearing, and a hypocycloid mechanism, one of its side plates being connected for example to the backrest and the other side plate connected for example to the seat part. The rotational speeds of such motors are fairly high, which requires very high reduction ratios and raises noise issues concerning the motor operation. In addition, the size and weight of such motors are significant.

There is therefore a need for motor-reduction gear combinations which allow reducing the noise and/or size and/or weight.

SUMMARY OF THE DISCLOSURE

The invention proposes a vehicle seat hinge mechanism adapted for connecting a first seat element to a second seat element, said mechanism comprising:
- a first member for connection to one of the first and second elements,
- a second member for connection to the other of the first and second elements, mounted to rotate about the first member on a hinge axis,
- reduction gearing arranged between an input member and the second member, the reduction gearing having a reduction ratio,
- a motor having a rotor rotatably secured to said input member of the reduction gearing, for driving the rotation of the second member relative to the first member through the reduction gearing,
characterized by the motor being a piezoelectric motor.

With these arrangements, it is possible to reduce the size and/or weight and/or operating noise of such motor-reduction gear combinations.

In various embodiments of the invention, one or more the following arrangements may be used:
- the reduction ratio of the reduction gearing is greater than or equal to 150 and the rated speed of the piezoelectric motor is less than 500 revolutions/min, such that the motor runs at a lower rotational speed and the operating noise can be reduced;
- the first element is a backrest and the second element is a seat part;
- the maximum torque of the piezoelectric motor is greater than 1 Newton-meter, such that the torque is sufficient to drive the hinge mechanism at a rotational speed of below 500 rev./min;
- the hinge mechanism further comprises an elastic biasing means adapted for applying torque in a first direction, about the hinge axis, to the second member relative to the first member, such that the motor can drive the hinge mechanism in both directions of rotation, the biasing means compensating for the effects of gravity or for the presence of a user on the seat.

According to one aspect of the invention, the reduction gearing can have a single reduction stage, which simplifies the mechanism and reduces its size. In addition, in the mechanism, the first member may comprise a first ring gear, centered on the main axis, the second member may comprise a second ring gear, centered on the main axis, and the reduction gearing comprises:
- a drive member rotationally guided about the main axis, comprising an input shaft and an inclined plane having a normal that is angularly offset relative to the main axis,
- an intermediate transmission member having a rear plane in sliding contact with said inclined plane, a front portion supported by the second member, a third ring gear engaging with the first ring gear, and a fourth ring gear engaging with the second ring gear.

In addition, the number of teeth of the third ring gear may be less than the number of teeth of the first ring gear, and the number of teeth of the fourth ring gear differs from the number of teeth of the second ring gear.

According to another aspect of the invention, the rotor shaft and the input member may be formed of a single piece, thus simplifying the mechanism.

According to yet another aspect of the invention, the reduction gearing can have a single reduction stage comprising a single hypocycloid stage of at least 250 teeth, thus reducing the size of the mechanism.

According to another aspect of the invention, the reduction gearing may comprise a first reduction stage formed of a planetary gear train, and a second reduction stage formed of a hypocycloid mechanism, thus allowing the mechanism to use optimized technological components.

According to another aspect of the invention, the reduction gearing may comprise a first reduction stage formed of double reduction gearing, and a second reduction stage formed of a hypocycloid mechanism, thus optimizing the size of the mechanism.

The invention also relates to a vehicle seat comprising a hinge mechanism as described above.

BRIEF DESCRIPTION OF THE DRAWINGS

Other aspects, objects, and advantages of the invention will be apparent from the following description of four of its embodiments, given by way of non-limiting examples, with accompanying drawings in which.

DETAILED DESCRIPTION OF THE DISCLOSURE

In the various figures, the same references are used to designate identical or similar elements.

Figure 1:
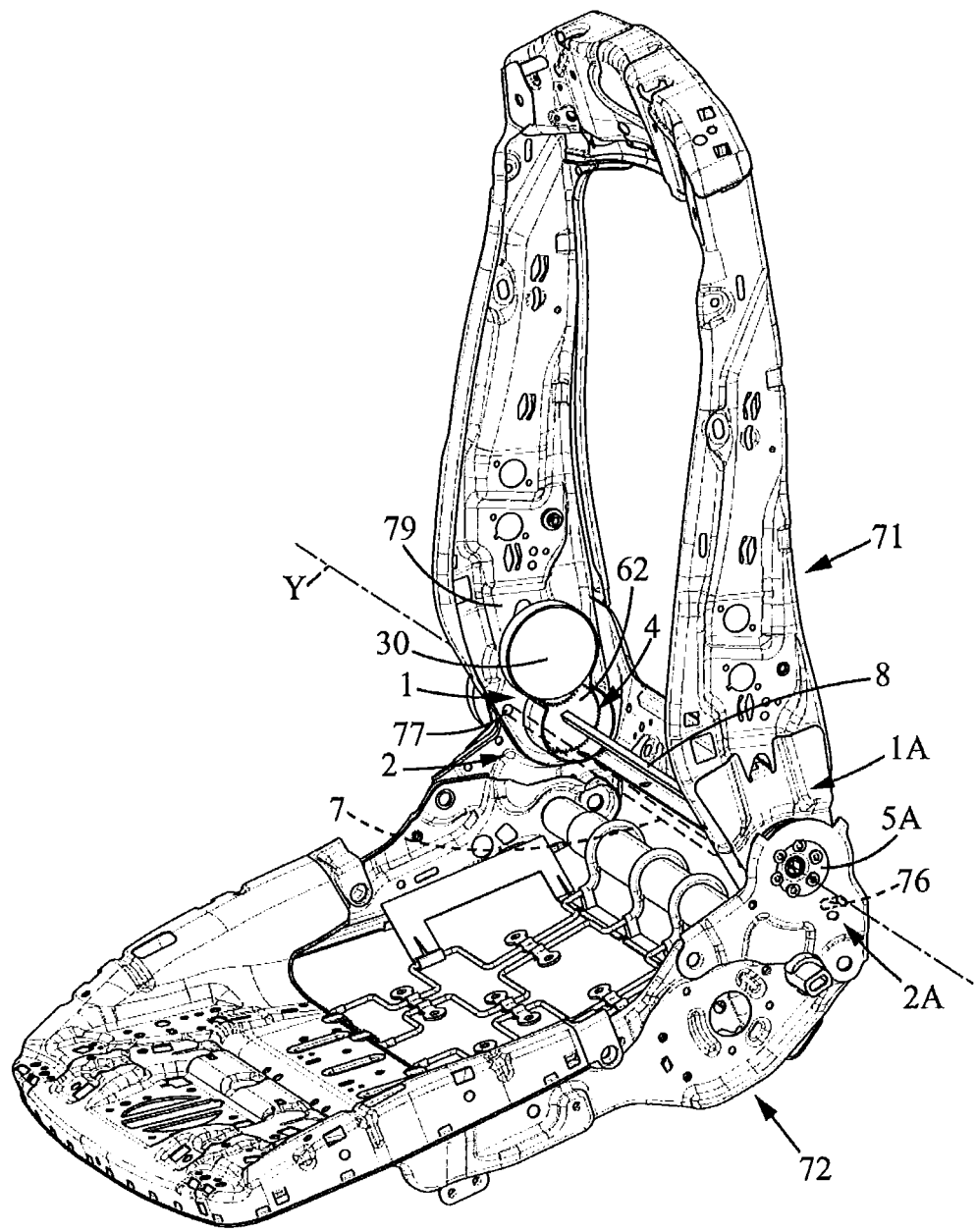
FIG. 1 is a perspective view of a seat structure comprising a hinge mechanism according to a first embodiment of the invention.

FIG. 1 shows a seat structure comprising a hinge mechanism according to a first embodiment of the invention, the seat padding and upholstery not being represented in the figures. The seat structure comprises a seat part 72, and a backrest 71 mounted on said seat part by means of a hinge mechanism which allows the backrest to rotate relative to the seat part about a hinge axis Y. In the example shown, the hinge mechanism is arranged on the right side of the seat but it could of course be located on the opposite side.

The hinge mechanism comprises:
a first metal member 1 to be connected to one of the elements selected from among the backrest and the seat part, which is the backrest 71 in the case illustrated here,
a second metal member 2 to be connected to the other of the elements selected from among the backrest and the seat part, which is the seat part 72 in the case illustrated here.

The first and second members 1,2 are mounted to be substantially pivoting relative to one another on the hinge axis Y, this motion possibly comprising a slight cycloid component as will be seen below.

The hinge mechanism further comprises a piezoelectric motor 30 and reduction gearing 4 to rotate the second member 2 relative to the first member 1. The piezoelectric motor 30 has a stator and a rotor 10 for connection to an input member 11 of the reduction gearing, in order to drive the rotation of the second member 2 relative to the first member 1 through said reduction gearing 4, the rated rotational speed of said piezoelectric motor being less than 500 rpm. Preferably, a piezoelectric motor can be chosen that has a rated speed of about 200 rpm, and optimally 180 rpm.

The reduction gearing 4 is arranged between the piezoelectric motor 30 and the second member 2; the reduction gearing 4 has a reduction ratio that is preferably greater than or equal to 150.

Advantageously according to the invention, the maximum torque of the piezoelectric motor 30 is greater than 1 Newton-meter. Such torque is higher than the usual torque for the motors conventionally used for these applications. For a given power, the increase in torque allows reducing the rotational speed and thus potentially reducing the noise generated, or at least the higher frequencies. Such a piezoelectric motor 30 is used in all the embodiments detailed below.

In a first embodiment, illustrated in FIGS. 1 to 4, the piezoelectric motor 30 and the reduction gearing 4 are arranged in an internal area 79 of the backrest frame that serves as their base plate.

The reduction gearing 4 comprises a first reduction stage formed of double reduction gearing 62, and a second reduction stage formed of a hypocycloid mechanism 5.

Figure 2:
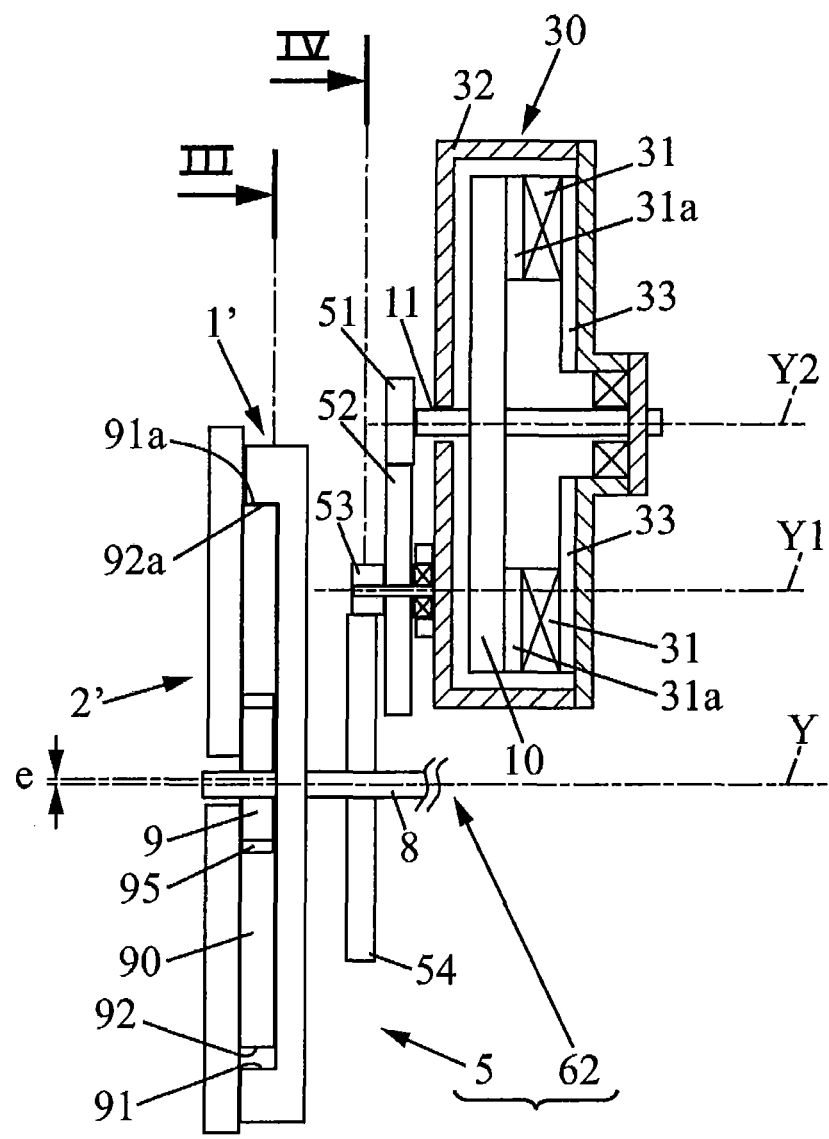
FIG. 2 is a diagram showing the motor and reduction gearing in the hinge mechanism of FIG. 1, FIGS. 3 and 4 are transverse cross-sections of the hinge mechanism of FIG. 1, respectively along lines III-III and IV-IV of FIG. 2.
Figure 3:
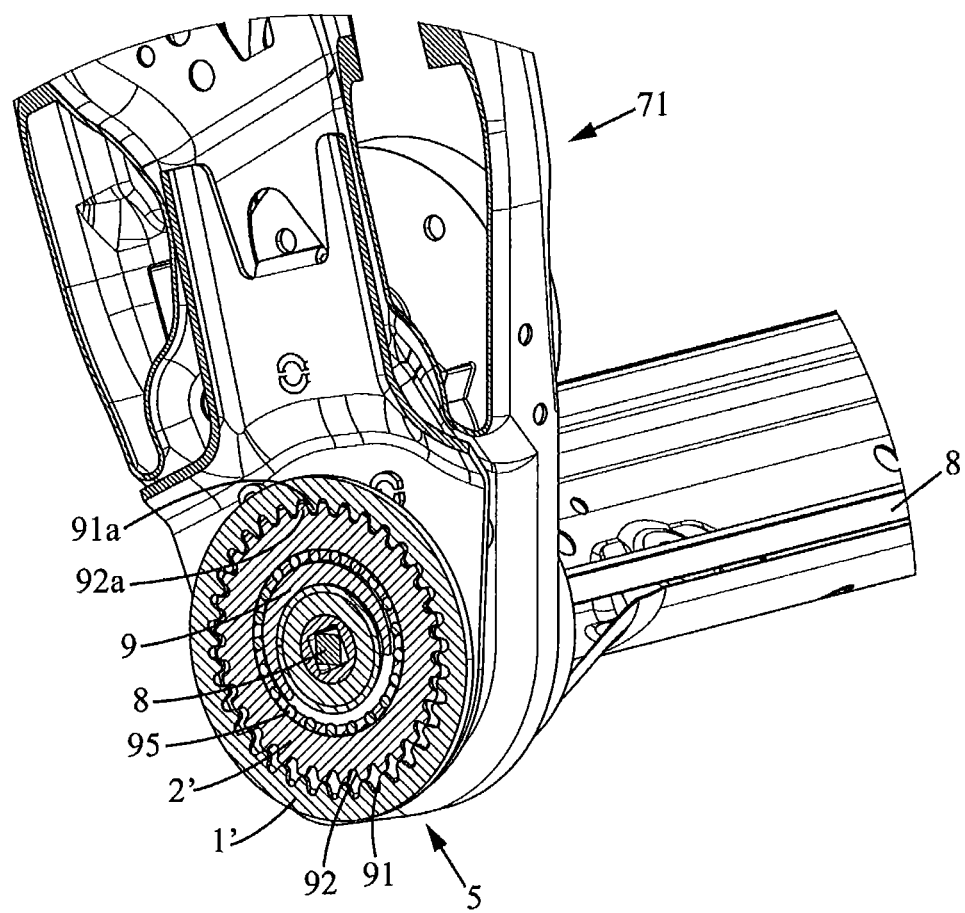
Figure 4:
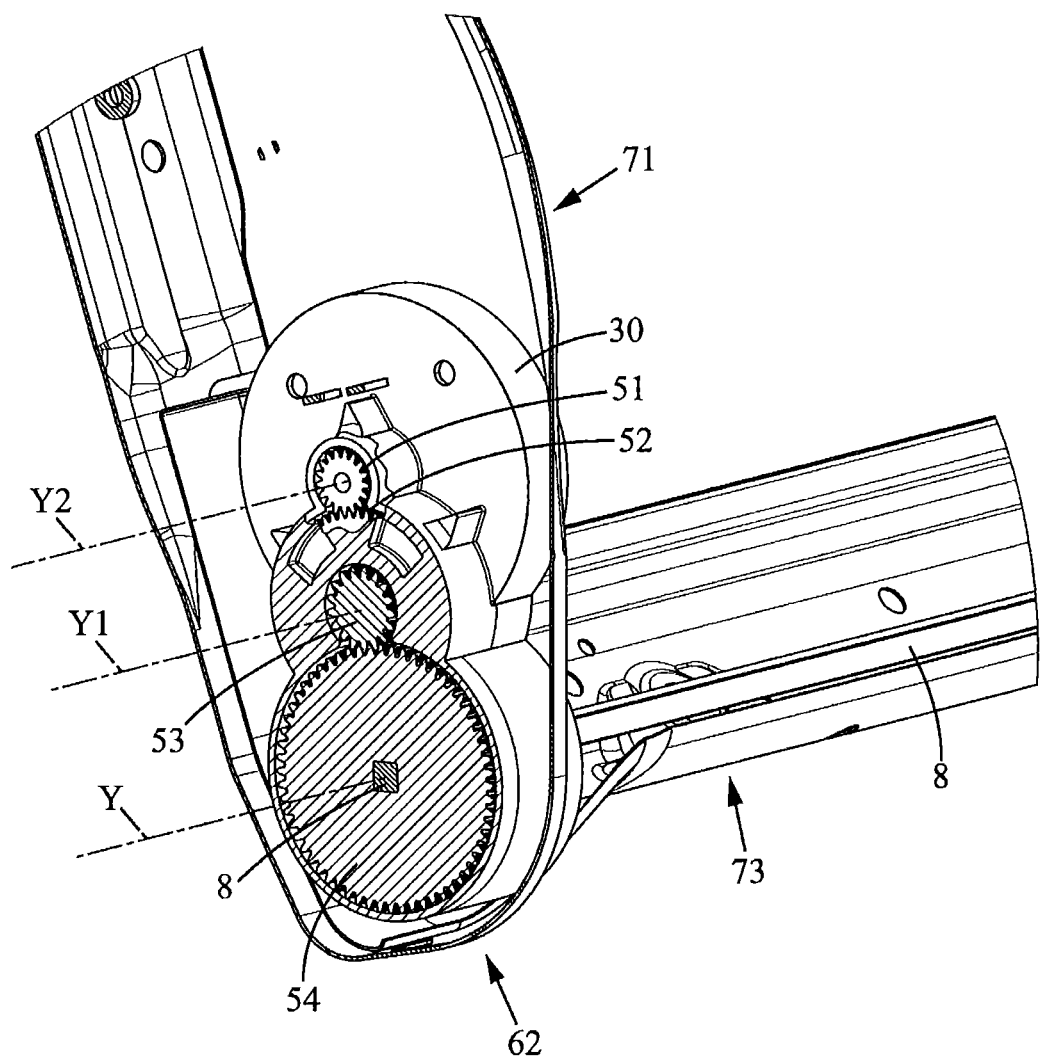
Figure 5:
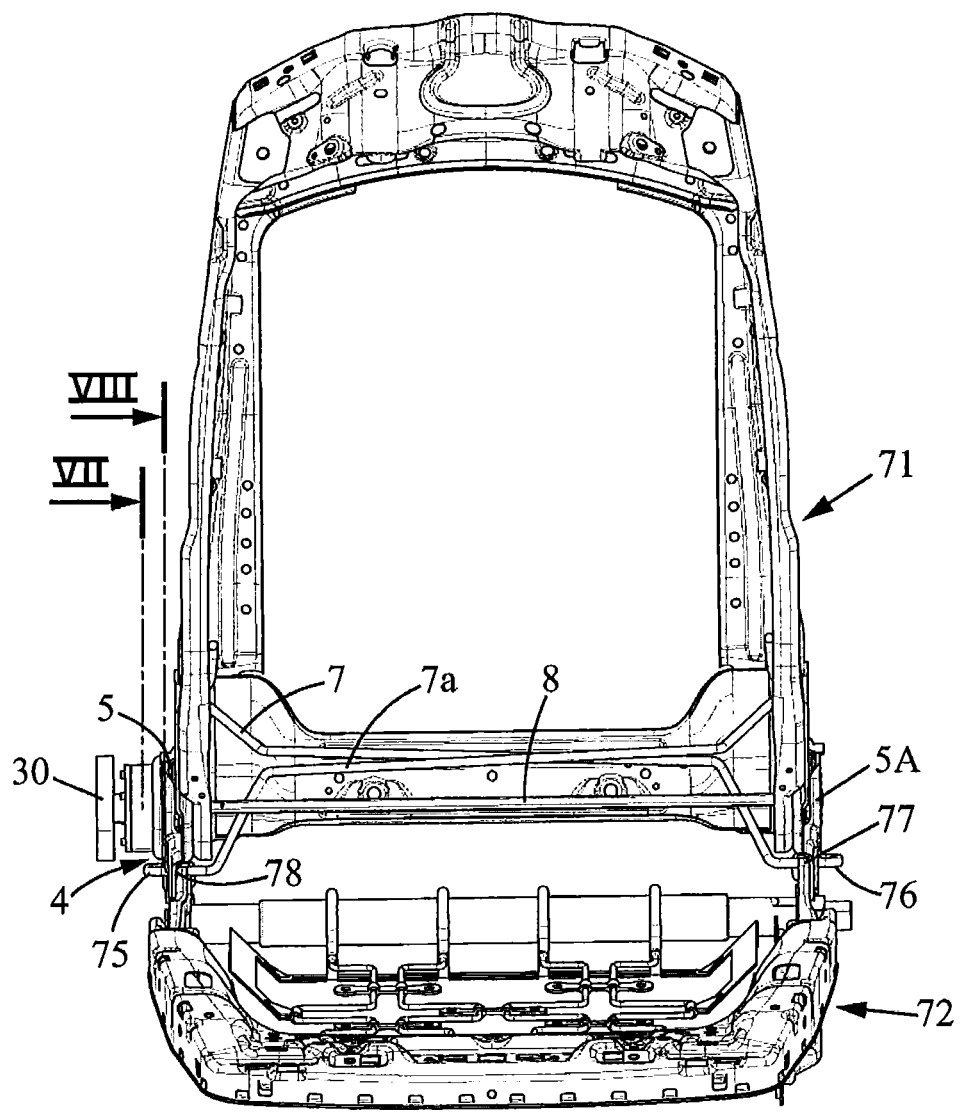
FIG. 5 is a perspective view of a seat structure comprising a hinge mechanism according to a second embodiment of the invention.
Figure 6:
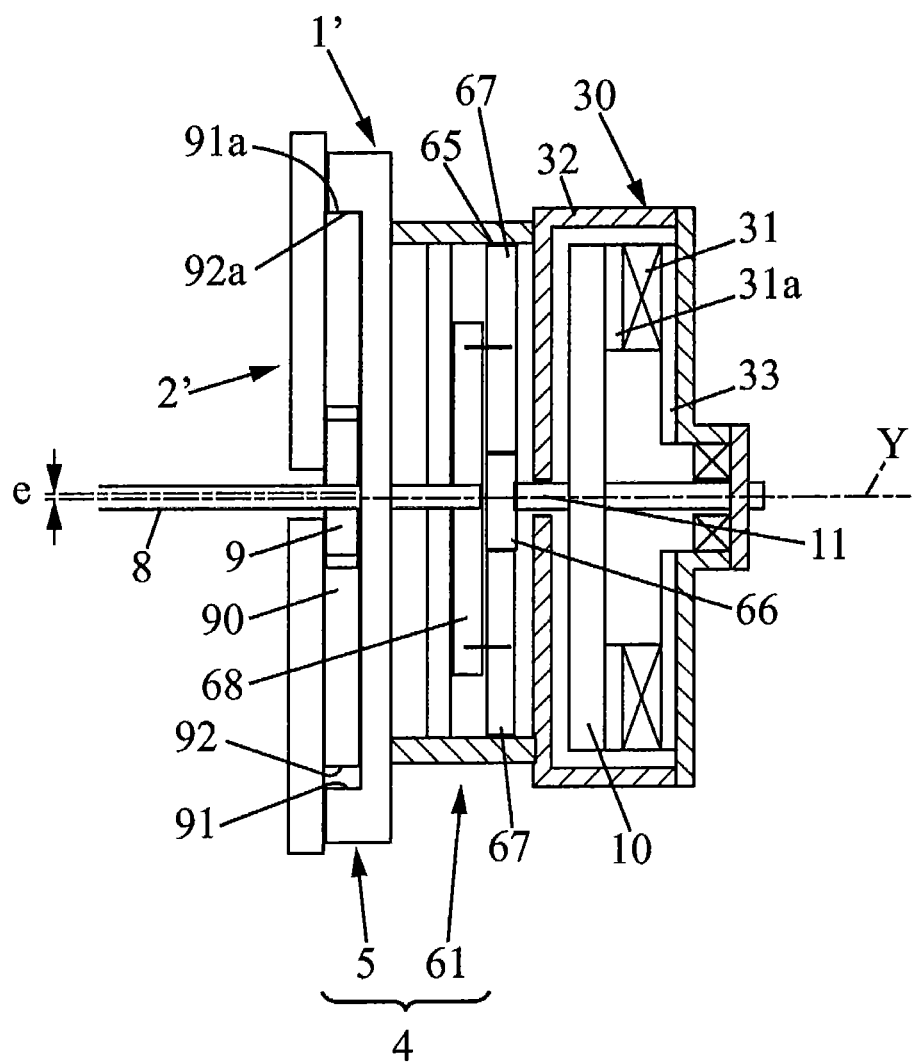
FIG. 6 is a diagram showing the motor and reduction gearing in the hinge mechanism of FIG. 5, FIGS. 7 and 8 are transverse cross-sections of the hinge mechanism of FIG. 5, respectively along lines VII-VII and VIII-VIII of FIG. 5.
Figure 7:
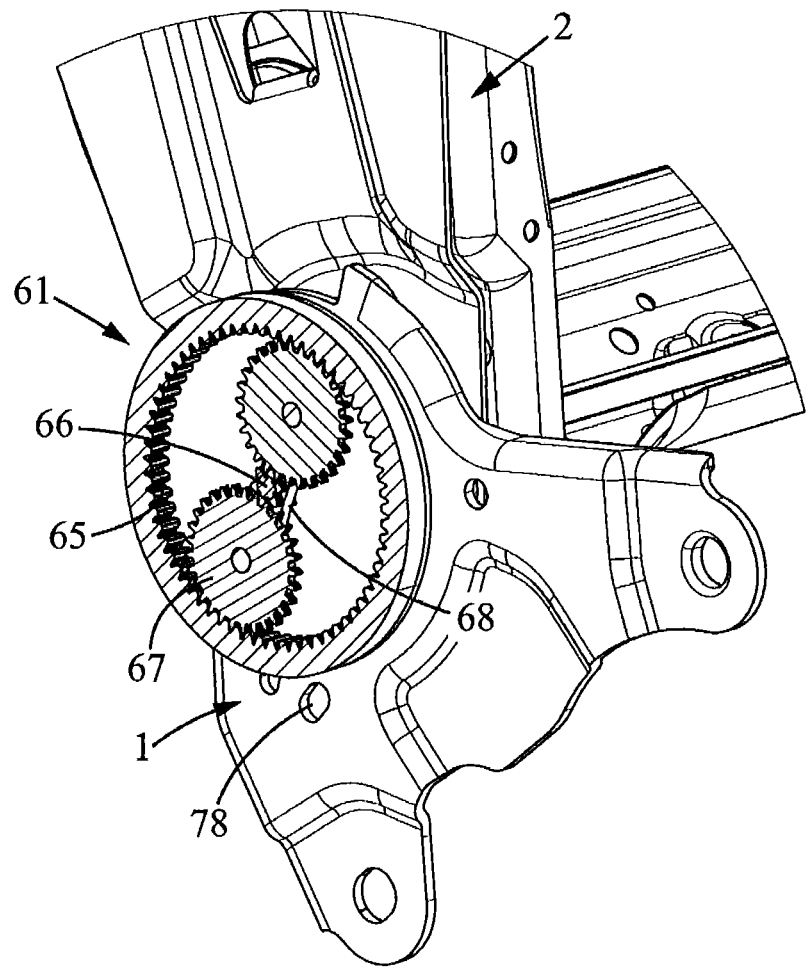
Figure 8:
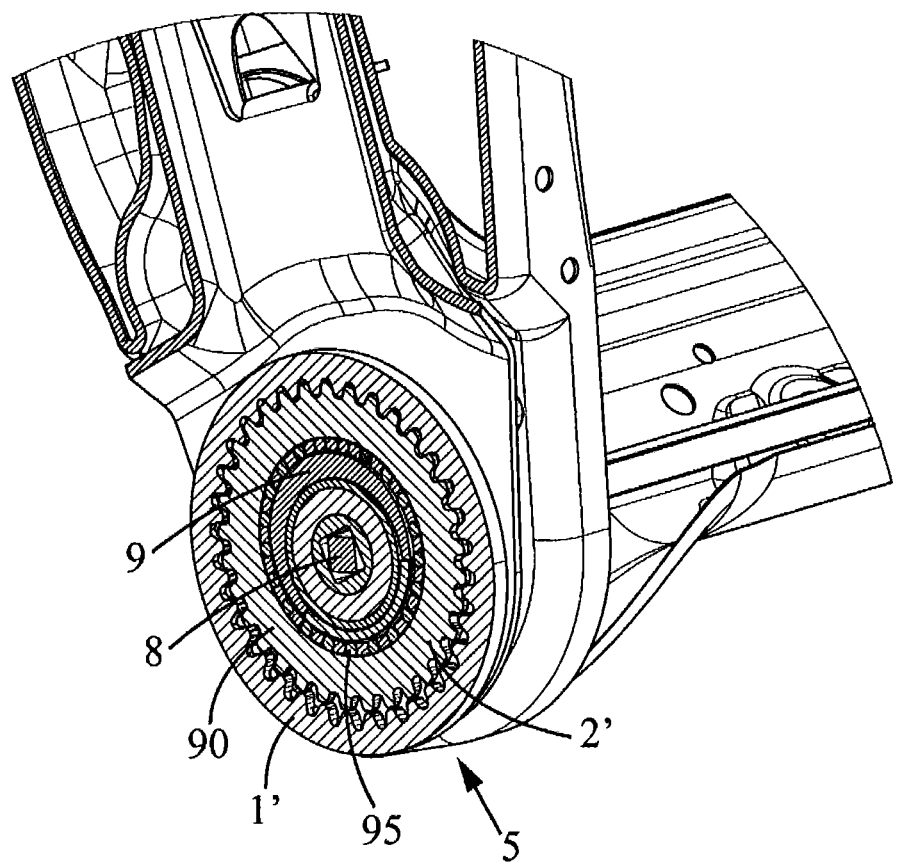

As shown in FIGS. 2, 3 and 4, the motor 30 comprises a housing 32 connected to the first member, a circuit board 33, and a stator 31, capable of causing rotational movement in a rotor 10 by creating mechanical waves of a predetermined shape created by piezoelectric elements 31a circularly arranged facing the rotor 10. The rotor 10 rotates about an axis Y2 parallel to the hinge axis Y and is coupled to an input member 11 of the reduction gearing, in particular of the first reduction stage 62.

This first reduction stage 62 is presented in the illustrated example as a series of two parallel gear trains, with a first small diameter gear 51 integral with the input member 11; this first gear 51, of axis Y2, drives a second gear 52 of larger diameter which results in a reduction of the rotational speed, for example in a ratio of about 3. The second gear 52 is centered on an axis Y1 parallel to the hinge axis Y and is rigidly coupled to a third gear 53 of smaller diameter which in turn drives a fourth gear 54 of larger diameter, integral in rotation with a drive shaft 8 and rotating about the hinge axis Y.

The first reduction stage has for example a reduction ratio of 3×3=9.

As a variant, one or two belt-type reduction gear trains could be used instead of the parallel reduction gears described above.

The drive shaft 8 represents the output from the first reduction stage 62 and the input to the second reduction stage formed by the hypocycloid mechanism 5. This hypocycloid mechanism 5 includes:
a first metal side plate 1' that can be coincident with the first member 1 or rigidly connected to the first member 1, this first side plate 1' having internal circular gear teeth 91,
a second metal side plate 2' which can be coincident with the second member 2 or rigidly connected to the second member 2, this second side plate 2' comprising a disk 90 having external circular gear teeth 92 which engage with the internal circular gear teeth 91 of the first side plate 1', and the external circular gear teeth of the second side plate 2' having a diameter smaller than the internal circular gear teeth of the first side plate, for example with a number of teeth that is lower by one,
an eccentric cam 9 rotatably connected to the drive shaft 8, causing a hypocycloid motion of the second side plate 2' such that there is always a portion 91a of the internal teeth 91 engaged with a corresponding portion 92a of the external teeth 92.

Each time the cam 9 completes a revolution, the second side plate 2' is offset by one tooth relative to the first side plate 1'. If the cam rotates in the opposite direction, the second side plate 2' is offset in the opposite direction by one tooth relative to the first side plate 1'.

The eccentricity 'e' of the cam 9 substantially corresponds to the difference in the median diameter of said gear teeth 91,92.

In the illustrated example, the internal circular gear teeth 91 consist of 34 teeth and the external circular gear teeth 92 consist of 33 teeth, resulting in a reduction ratio of 34 for the hypocycloidal mechanism 5.

Thus, for the entire reduction gearing, a reduction ratio R is obtained of 34.3 multiplied by 9 which is 306, and therefore in particular R>150.

Thus angular displacements of the backrest are obtained with an angular speed of between 2 and 6 degrees per second.

In the illustrated example, a roller bearing type of rolling mechanism 95 is placed between the cam 9 and the disk 90.

In addition, the hinge mechanism may include an elastic biasing means 7, adapted for applying torque in a first direction, about the hinge axis Y, to the second member 2 relative to the first member 1. This elastic biasing means 7 is present in the illustrated example as a torsion bar anchored at one of its ends 75 in a hole 77 in the first member 1 and attached at its opposite end 76 to the second member 2A in another hole 78, the left second member 2A being connected to the second member 2 (right side) through the seat frame 71. The elastic biasing means 7 could also be present as a spring, for example helical, placed directly between the first member 1 and the second member 2, arranged on the right side of the seat. Any solution for directly or indirectly applying a restoring torque between the first member 1 and the second member 2 is suitable and is within the scope of the invention.

In the example shown, the elastic biasing means 7 exerts a torque tending to push the backrest towards the front of the seat; this torque is added to the torque from the motor, particularly when rotating the backrest forwards with a user on the seat, which has the natural tendency to exert a rearward force.

In addition, when the backrest is reclined significantly rearward, gravity acts, to contribute torque which tends to rotate the backrest even further back. The elastic biasing means 7 exerts opposing torque, which can increase with the seat angle to compensate for the effects of gravity. A slight forward bias may be arranged for when the backrest is in the substantially vertical position.

Unless otherwise controlled by the motor 30, the first and second members 1,2 are fixed relative to each other by the irreversibility of the mechanism. The hypocycloid mechanism 5 does not allow a torque exerted on its output to create a force and torque sufficient to turn the cam 9, thus ensuring irreversibility, and the first and second side plates 1', 2' cannot rotate relative to each other and therefore the first and second members 1,2 can only move relative to each other when so controlled by the motor, even during significant acceleration or an impact to the vehicle.

It should be noted that in this first embodiment, the first side plate 1' is connected to the backrest 71 and the second side plate 2' is connected to the seat part 72. Due to the relative hypocycloid movement of the first side plate in relation to the second side plate, with each revolution of the cam 9, the axis Y moves in a circle having a radius equal to the eccentricity 'e' of the cam, but this movement of the backrest relative to the position of the seat part is small in scale.

According to this first embodiment, there may be an auxiliary hinge mechanism 5A arranged at the opposite side of the seat, which is the left side in the example represented. This auxiliary hinge mechanism 5A is simpler than the one described above, as it simply comprises a hypocycloid mechanism 5A, the latter being similar or identical to what has been described. Said hypocycloid mechanism 5A is centered on Y and is controlled by an extension of the drive shaft 8, in a manner that is synchronous with the main hypocycloid mechanism 5 arranged on the right side in the example shown.

According to a second embodiment of the invention (FIGS. 5-8), the piezoelectric motor 30 and the reduction gearing 4 are arranged in an external area of the frame of the seat part, protruding outward on the right side and extending concentrically to axis Y.

The reduction gearing 4 comprises a first reduction stage formed by a planetary gear train 61, and a second reduction stage formed by a hypocycloid mechanism 5, the latter being similar or identical to what was described for the first embodiment. Similarly, the piezoelectric motor 30 is similar or identical to what was described for the first embodiment, and a detailed description of these elements will therefore not be repeated here.

As for the planetary gear train 61, it comprises, as is known from the prior art, a driving central gear 66, which meshes with the planetary gear teeth 67 on a planet carrier 68 engaging with a ring having peripheral teeth 65. The reduction ratio of the planetary gear train 61 may for example be between 6 and 12, and preferably about 10.

It should be noted that in this second embodiment, the first side plate 1' is connected to the seat part 72 and the second side plate 2' is connected to the backrest 71. Due to the relative hypocycloid movement of the first side plate in relation to the second side plate, with each revolution of the cam 8, axis Y remains stationary but the center of the second side plate 2' moves along a circle having a radius equal to the eccentricity "e" of the cam, although this movement of the backrest relative to the position of the seat part is small in scale. The reduction ratio R is then 10 multiplied by 34, which is 340.

Still according to this second embodiment, there may also be an auxiliary hinge mechanism 5A arranged on the opposite side of the seat, controlled by the drive shaft 8 which extends from one side to the other.

In addition, in a variant not represented, the drive shaft 8 can pass through the motor 30 when said motor is located within the inner space of the frame.

Figure 9:
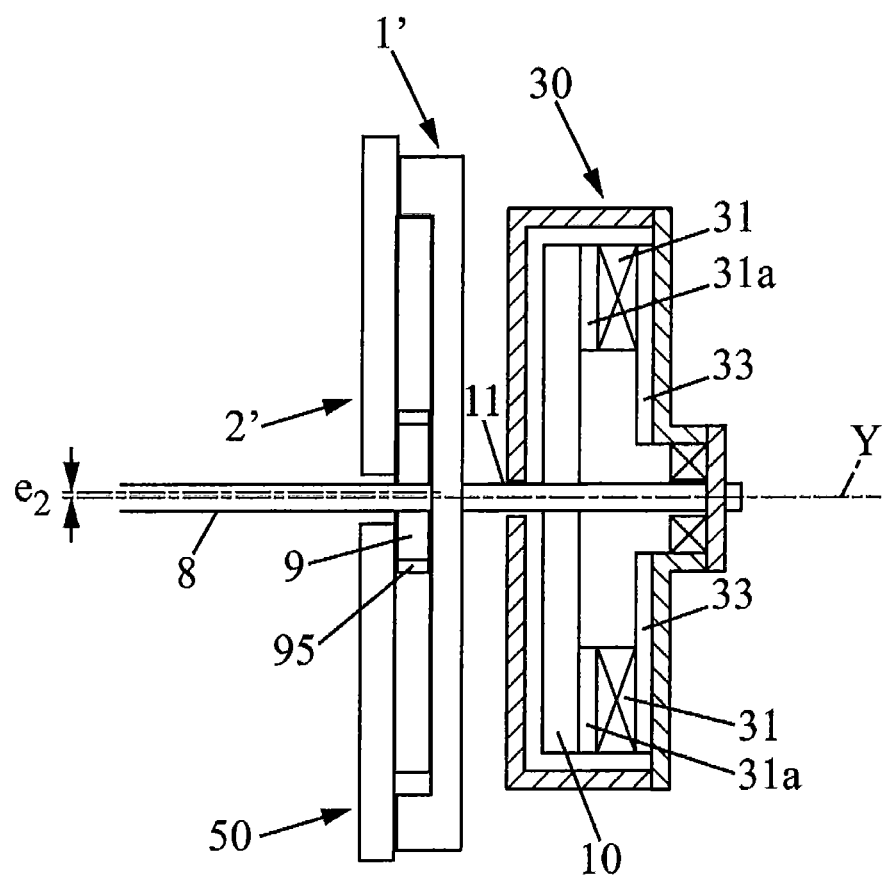
FIG. 9 shows a diagram representing the motor and reduction gearing in a hinge mechanism according to a third embodiment of the invention.
Figure 10:
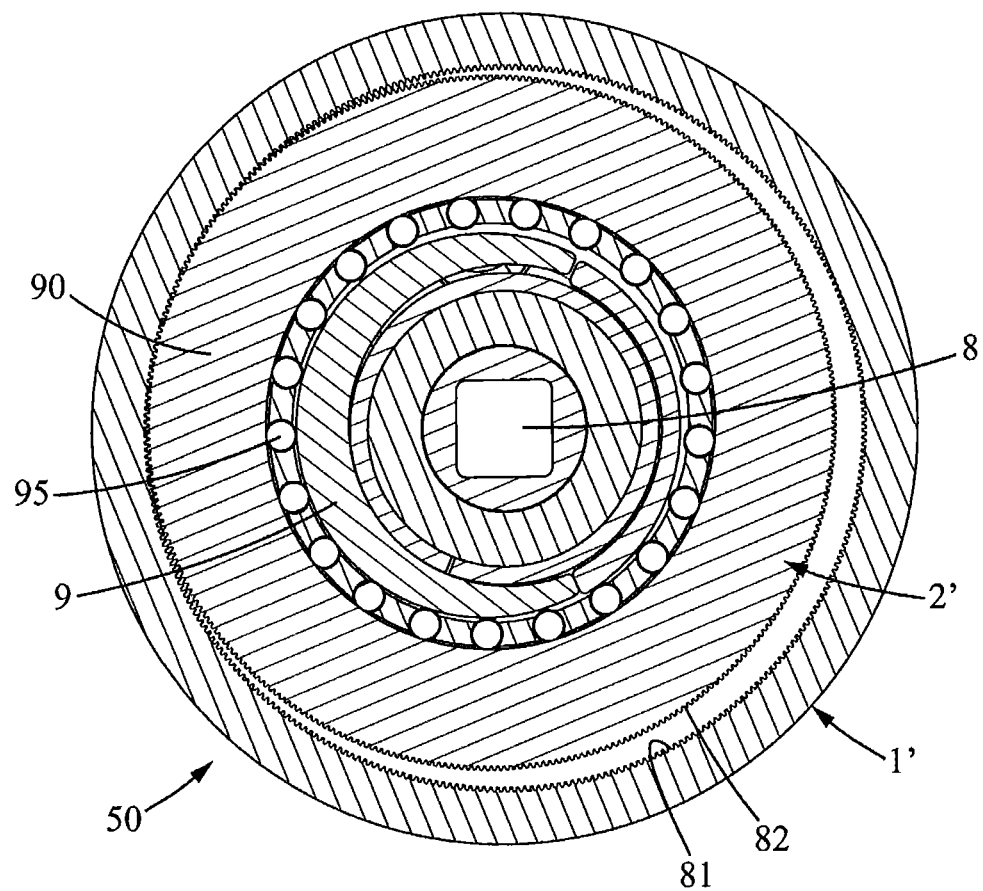
FIG. 10 is a transverse cross-section of the hinge mechanism of FIG. 9.

In a third embodiment of the invention (FIGS. 9 to 10), the piezoelectric motor 30 is similar or identical to the above description. In contrast, the reduction gearing 4 comprises reduction gearing having a single reduction stage. In this embodiment, the rotor 10 is directly coupled to the drive shaft 8 which drives the cam 9 of a hypocycloid mechanism 50 similar in principle to the one already described.

However, in the example illustrated, the internal teeth 81 of the first side plate comprises 330 teeth and the external teeth 82 of the second side plate 2' comprises 329 teeth. Each time the cam 9 completes a revolution, the second side plate 2' is angularly offset by one tooth relative to the first side plate. Instead of one tooth, this could also be an offset of several teeth.

Still according to this third embodiment, there may also be an auxiliary hypocycloid mechanism arranged at the opposite side of the seat, controlled in a synchronized manner by the drive shaft 8 which extends from one side to the other. This auxiliary hypocycloid mechanism comprises the same number of teeth as the hypocycloid mechanism 50 described above for the third embodiment.

Figure 11:
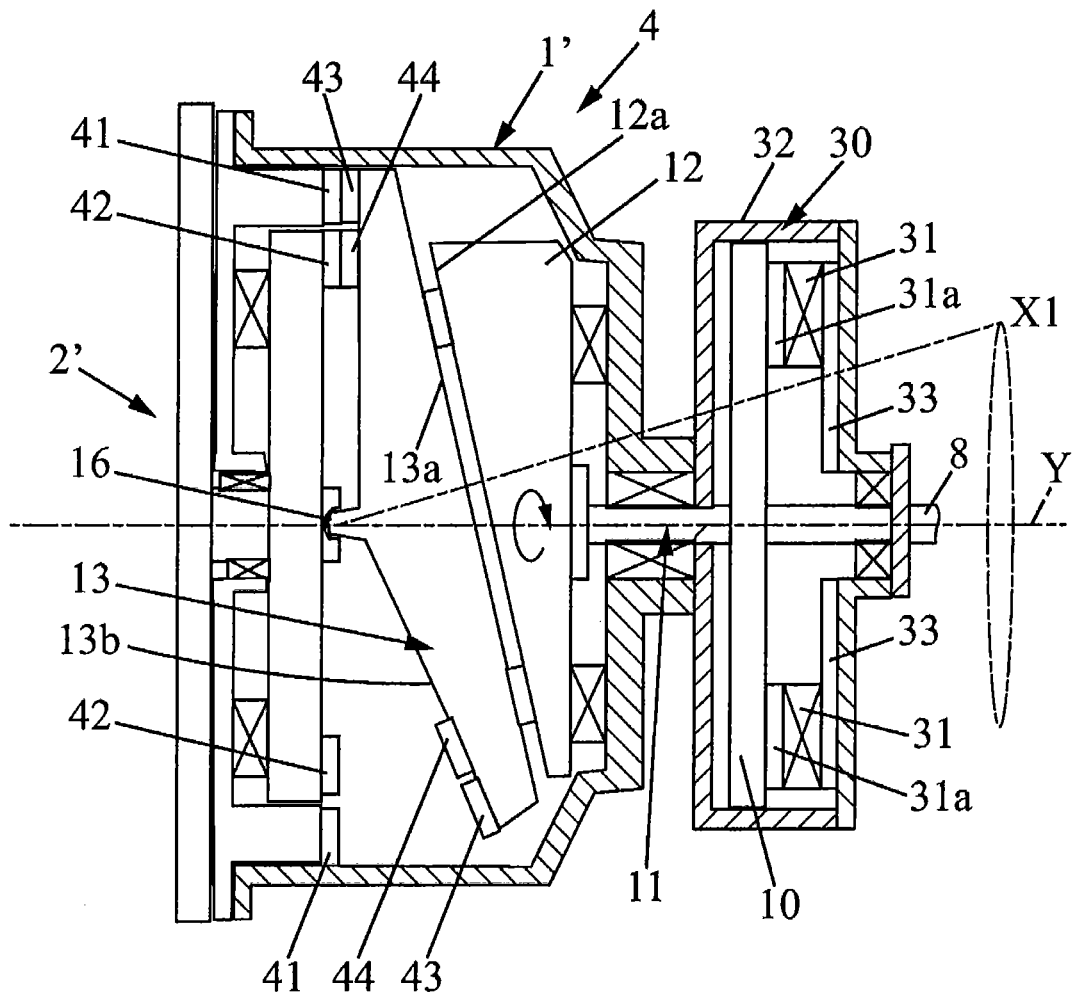
FIG. 11 shows a diagram representing the motor and reduction gearing in a hinge mechanism according to a fourth embodiment of the invention.

According to a fourth embodiment of the invention, illustrated in FIG. 11, the piezoelectric motor 30 is similar or identical to the above description, but the reduction gearing 4 comprises a single reduction stage, also known as an 'inclined plane reduction gearing', which will be described below.

The first member 1 comprises a first ring gear 41, centered on the main hinge axis Y, the tips of the teeth being perpendicular to the main axis Y.

The second member 2 comprises a second ring gear 42, centered on the main axis Y and parallel to the first ring gear 41.

The reduction gearing comprises:
 a drive member 12 rotationally guided about the main axis Y, comprising an input shaft 11 and an inclined plane 12a having a normal X1 that is angularly offset relative to the main axis,
 an intermediate transmission member 13 having a rear plane 13a in sliding contact with said inclined plane, a front frustoconically-shaped portion centered on X1, supported by the second member by means of a ball joint 16, a third ring gear 43 on the periphery of the frustoconical shape and engaging with the first ring gear 41, and a fourth ring gear 44 adjacent to the third ring gear 43 and engaging with the second ring gear 42.

When the rotor of the motor rotates, it causes the drive member 12 to rotate and its normal X1 pivots about axis Y.

In a particularly preferred embodiment, the number of teeth on the third ring gear 43 is less than the number of teeth of the first ring gear 41. Thus, when the drive member executes a complete revolution, the intermediate transmission member 13 is angularly offset relative to the housing by one or more teeth depending on the difference in the number of teeth, and this offset is in a first angular direction.

In addition, the number of teeth of the fourth ring gear 44 differs from the number of teeth of the second ring gear 42. Thus when said intermediate transmission member 13 executes a complete revolution, the intermediate transmission member 13 is angularly offset by one or more teeth depending on the difference in the number of teeth and for example in an angular direction which may be the same as or may be opposite to the first angular direction.

It is then possible to obtain a very high reduction ratio R, for example with the number of teeth being 20 and 19 respectively for the first and third ring gears 41,43 and the number of teeth being 17 and 16 respectively the second and fourth ring gears 42,44, which gives a reduction ratio of 340.

Advantageously, in one aspect of the invention, the rotor shaft 10 and the input shaft 11 may be formed of a single piece.

According to this fourth embodiment, there may also be a second 'inclined plane reduction gearing' arranged on the opposite side and controlled in a synchronous manner by the drive shaft 8 which extends from one side to the other.

It should be noted that the auxiliary hinge mechanism 5A arranged on the opposite side of the seat is optional and could be reduced to a simple pivoting connection.

It should also be noted that the hinge mechanism described above is not limited to a hinge for a backrest and can be used for example by considering the seat element to be the seat part relative to the base, and in this case it is the height adjustment that is concerned; it can also be used to pivot an element, such as the front edge of the seat cushion relative to the seat part or any other movable part of the seat.

Of course, a piezoelectric motor assumes the presence of an electronic control unit, which is for example present on the circuit board 33; the mechanism may additionally include a sensor, for example a Hall effect sensor, for capturing the position and/or speed of the rotor. The electronic control unit can use the information from the sensor to control the stator 31.

It should also be noted that the use of a piezoelectric motor reduces the electromagnetic emission levels in comparison to a DC motor solution.

The invention claimed is:

1. A hinge mechanism for vehicle seat, the mechanism being adapted for connecting a first element of the seat to a second element of the seat, the mechanism comprising:
   a first member for connection to one of said first and second elements,
   a second member for connection to the other of the first and second elements, mounted to rotate about the first member on a hinge axis,
   reduction gearing arranged between an input member and the second member, said reduction gearing having a reduction ratio,
   a motor having a rotor rotatably secured to said input member of the reduction gearing, for driving the rotation of the second member relative to the first member through the reduction gearing,
   wherein the motor is a piezoelectric motor.

2. The hinge mechanism according to claim 1, wherein the reduction ratio of the reduction gearing is greater than or equal to 150, and wherein the piezoelectric motor exhibits a rated rotational speed which is less than 500 revolutions/min.

3. The hinge mechanism according of claim 1, wherein the first element is a backrest of the seat and the second element is a seat part of the seat.

4. The hinge mechanism according to claim 1, wherein the piezoelectric motor exhibits a maximum torque which is greater than 1 Newton-meter.

5. The hinge mechanism according to claim 1, further comprising an elastic biasing member adapted for applying torque in a first direction, about the hinge axis, to the second member relative to the first member.

6. The hinge mechanism according to claims 1, wherein the reduction gearing comprises a first reduction stage formed of a planetary gear train, and a second reduction stage formed of a hypocycloid mechanism.

7. The hinge mechanism according to claim 1, wherein the reduction gearing comprises a first reduction stage formed of double reduction gearing, and a second reduction stage formed of a hypocycloid mechanism.

8. A motor vehicle seat comprising a hinge mechanism according to claim 1.

9. The hinge mechanism according to claim 1, wherein the reduction gearing has a single reduction stage.

10. The hinge mechanism according to claim 9, wherein the reduction gearing has a single reduction stage comprising a single hypocycloid stage of at least 250 teeth.

11. The hinge mechanism according to claim 1, wherein:
    the first member comprises a first ring gear, centered on the hinge axis,
    the second member comprises a second ring gear, centered on the hinge axis,
    the reduction gearing comprises:
    a drive member rotationally guided about the hinge axis, comprising an input shaft and an inclined plane having an orthogonal direction that is angularly offset relative to the hinge axis,
    an intermediate transmission member having a rear plane in sliding contact with said inclined plane, a front portion supported by the second member, a third ring gear engaging with the first ring gear, and a fourth ring gear engaging with the second ring gear.

12. The hinge mechanism according to claim 11, wherein the number of teeth of the third ring gear is less than the number of teeth of the first ring gear, and the number of teeth of the fourth ring gear differs from the number of teeth of the second ring gear.

13. The hinge mechanism according to claim 11, wherein a rotor shaft and the input shaft are formed of a single piece.

* * * * *